Nov. 3, 1953   E. BUTTERWORTH ET AL   2,657,578
DRY GAS METER
Filed July 20, 1951

Inventors
E. Butterworth
E. J. Hinchcliffe
By Glascock Downing Rutled
Attys.

Patented Nov. 3, 1953

2,657,578

UNITED STATES PATENT OFFICE 2,657,578

DRY GAS METER

Edward Butterworth and Eric John Hinchcliffe, Farnworth, England, assignors to Begwaco Meters Limited, Farnworth, England, a British company Application July 20, 1951, Serial No. 237,694

Claims priority, application Great Britain May 9, 1951

1 Claim. (Cl. 73—263)

This invention relates to dry gas meters and has for its object to provide an improved construction in which the accuracy of registration is as closely consistent as possible at all rates of flow and under varying pressures of gas, and in which the greatest possible amount of gas is passed for a given absorption of pressure to work the meter.

In the known arrangements, a gas measuring chamber is divided into two compartments by a diaphragm having a centrally located rigid part with a surrounding flexible part secured at its edges. A considerable area of flexible material is required to allow the rigid part of the diaphragm to reciprocate, which material is unsupported and is free to stretch and fold to a degree which varies with the flow and pressure, thus varying the accuracy of the meter. Also the rigid part of the diaphragm can take up oblique positions with the result that the flexible material may form pockets in the extreme positions of the diaphragm.

According to the present invention, the rigid part of each diaphragm is fulcrumed at one end on a flag rod mounted in the measuring chamber and swings about the axis of the flag rod.

With this arrangement, the diaphragm cannot take up undesired positions, and the area of flexible material is much reduced towards the pivoted end so that it does not stretch and fold to an undesirable extent.

According to a further feature of the invention, each gas measuring chamber is wedge-shaped, the flag rod being mounted at the narrower end, and the parts forming the chamber are suitably shaped to support the greater part of the flexible material in the extreme positions of the diaphragm.

Referring to the accompanying explanatory drawing.

The meter has two gas measuring chambers 1, each formed of two halves secured together by flanges 2. In each chamber there is a diaphragm having a flexible part 3 which is held between the flanges 2, and a rigid part 4 consisting of metal or other rigid plates secured on each side of the flexible part, whereby the chamber is divided into two compartments.

Figure 2:
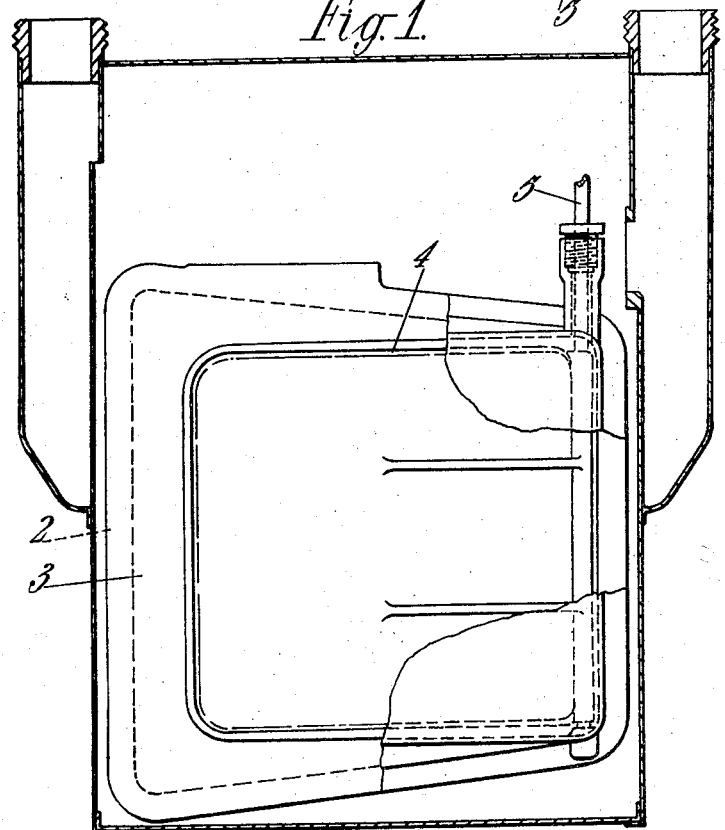
Figure 2 is a sectional elevation.

The chamber 1 is narrower at one end, and at this end and at one side a flag rod 5 is rotatably mounted in the chamber, and passes through the top of the chamber being coupled in the usual manner to the registration mechanism. The rigid part 4 of the diaphragm is substantially rectangular and is secured to or made integral with the rod 5. The wider end of the chamber has a wedge-shaped end wall 6, and the part 4 extends from the rod 5 to near the corner formed by the side of the chamber and the end wall 6. The compartment is also deeper at the wider end, as shown in Figure 2 and its top and bottom are formed similarly to the end wall 6.

Figure 1:
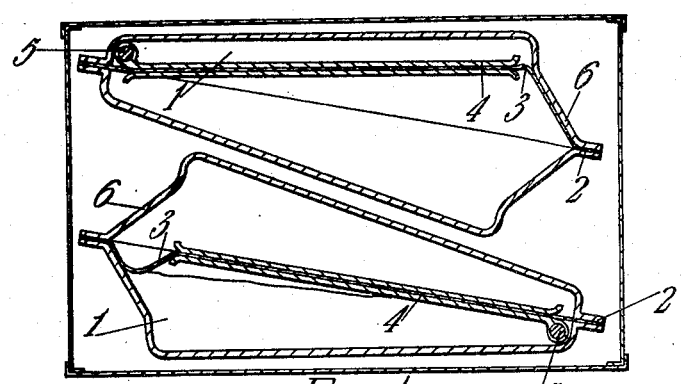
Figure 1 is a diagrammatic horizontal section of a dry gas meter in accordance with the invention.

In the extreme position of the diaphragm shown in the upper part of Figure 1, the flexible part 3 rests on the end wall 6 without any variation or pocketing which might cause a loss of consistency of accuracy. As the diaphragm swings, the flexible part gradually leaves the end wall as shown in the lower part of Figure 1, and finally lies against the other side of the end wall. The flexible area is much smaller at the pivoted end of the diaphragm, and is not sufficient to form folds or pockets which would interfere with the accuracy of the meter.

The area of flexible material is relatively smaller than in known constructions, so that consistency is improved, and the proportion of rigid to flexible area is greater, so that better use is made of the gas pressure in driving the meter. Also the movements of the rigid part are controlled, whereas in the case of diaphragms hinged at their centers to arms on the flag rods, the diaphragm may take-up oblique positions, resulting in formation of pockets in the flexible material and in variation of absorption of pressure.

What we claim is:

A dry gas meter, comprising in combination, two gas measuring chambers, a diaphragm in each gas measuring chamber dividing it into similar compartments, each diaphragm comprising a centrally located rectangular rigid portion and a surrounding portion of flexible material connected to said rigid rectangular portion and to walls of the gas measuring chamber, each compartment being narrower at one end than the other and the wider end of each compartment being deeper than the other end and having walls which make an angle to one another so that the flexible part of the diaphragm can rest on such walls in its extreme positions, a flag rod extending up through each measuring chamber at its narrow end and having the rigid portion of the diaphragm in such chamber connected thereto, the area of flexible material around the rigid portion of each diaphragm being much smaller at the pivoted end of the diaphragm than at the free end and at such free end being insufficient to form folds or pockets but sufficient only to rest freely on the walls of the measuring chamber in the extreme positions of the diaphragm.

EDWARD BUTTERWORTH.
ERIC JOHN HINCHCLIFFE.

References Cited in the file of this patent

UNITED STATES PATENTS

| Number | Name | Date |
| --- | --- | --- |
| 180,631 | Phillips | Aug. 1, 1876 |
| 183,510 | Phillips | Oct. 24, 1876 |
| 804,464 | Haas | Nov. 14, 1905 |

FOREIGN PATENTS

| Number | Country | Date |
| --- | --- | --- |
| 12,053 | Great Britain | 1848 |